United States Patent [19]

Leadbeatter

[11] Patent Number: 4,541,465

[45] Date of Patent: Sep. 17, 1985

[54] EXPANDABLE WOODTURNING CHUCK

[76] Inventor: Bruce R. Leadbeatter, 59 Turton Ave., Belmore, New South Wales 2192, Australia

[21] Appl. No.: 537,443

[22] Filed: Sep. 30, 1983

[30] Foreign Application Priority Data

Sep. 30, 1982 [AU] Australia ............................... PF6128
Dec. 7, 1982 [AU] Australia ............................... PF7150

[51] Int. Cl.⁴ ............................................... B27C 7/00
[52] U.S. Cl. ..................................... 142/55; 279/2 R; 82/44
[58] Field of Search .................. 82/44; 279/2; 142/52, 142/54, 48, 55; 408/196, 228; 242/72.1

[56] References Cited

U.S. PATENT DOCUMENTS

| | | | |
|---|---|---|---|
| 298,529 | 5/1884 | Weisse | 142/52 |
| 480,435 | 8/1892 | McGraw | 82/44 |
| 1,359,992 | 11/1920 | Hook | 279/2 |
| 1,611,439 | 12/1926 | Haulick | 279/2 |
| 1,918,522 | 7/1933 | Crane | 82/44 |
| 2,348,819 | 5/1944 | Johnson | 279/2 |
| 2,750,196 | 6/1956 | Peczynski | 82/44 |
| 3,986,383 | 10/1976 | Petteys | 72/393 |
| 4,286,904 | 9/1981 | Porter et al. | 408/228 |

FOREIGN PATENT DOCUMENTS 2002698  7/1971  Fed. Rep. of Germany ...... 408/196

*Primary Examiner*—Leonidas Vlachos
*Attorney, Agent, or Firm*—Berman, Aisenberg & Platt

[57] ABSTRACT

The present invention relates to an expandable chuck for faceplate woodturning. The chuck is of simple construction for attachment to a conventional faceplate. A frusto-conical plug drawn towards the faceplate expands a radially segmented annular member. An annular resilient ring biases the annular member against expansion. Preferably a keeper also prevents disintegration of the segmented annular member under high centrifugal stress.

9 Claims, 5 Drawing Figures

EXPANDABLE WOODTURNING CHUCK

The present invention relates to woodturning and, in particular, to an expandable woodturning chuck for use in faceplate turning on a wood turning lathe.

"Faceplate turning" is the expression used for the turning of wood articles such as fruit bowls from a solid piece of wood. This activity involves screwing onto the threaded end of a lathe spindle, a correspondingly internally threaded boss of a faceplate. The faceplate normally consists of a metal disc having an outwardly facing annular flange provided with a plurality of screw holes.

In order to secure the roughly cylindrical blank from which the fruit bowl, for example, is to be turned, screws are passed through the screw holes in the faceplate and into the blank. This method of securing the blank to the faceplate has the advantage that the blank is securely held to the faceplate. However, this method of securing the blank to the faceplate has the disadvantage that a number of unsightly holes are left in the base of the finished object. In addition, if the object must be removed from the lathe during the turning, the screws do not generally permit the job to be accurately re-centred on the faceplate. This latter disadvantage is a substantial disadvantage in the teaching of woodwork since each student normally has his workpiece secured to a lathe in turn so that all workpieces go through a similar processing stage in sequence.

An alternative method of securing the workpiece to the faceplate is to secure a wooden plate to the workpiece, preferably with a sheet of suitable paper, glued on both sides, interposed between the plate and the workpiece. In this way, holes in the base of the workpiece are avoided, but the slightest undue lateral pressure when turning may well disengage the plate and workpiece. Again, it is nearly impossible to accurately re-centre the workpiece once it has been removed from the wooden plate.

In order to overcome the above mentioned difficulties and provide a means of securing a workpiece to a faceplate so that the workpiece can be removed and re-centred without difficulty, it is known to first form a cavity in the base of the workpiece and then mount the cavity on an expanding chuck or collet. Australian Pat. Nos. 448,065 and 209,395 and British Pat. Nos. 16,486 and 122,971 disclose various arrangements of chucks which are, to a greater or lesser degree, suitable for this purpose. In particular, these chucks are relatively complex pieces of equipment including many components which must be accurately machined. In many instances, such chucks also require a relatively deep cavity in the workpiece.

In particular, the complexity of such chucks renders them unsuitable for teaching woodturning, especially at a low level where students may well be inexperienced. In addition, the cost of such chucks is prohibitive, especially where large numbers of chucks must be purchased in order that each of the students in a class can simultaneously gain practical experience.

It is the object of the present invention to provide an expandable woodturning chuck which will enable the removal and re-centring of a work piece and which also has only a small number of parts and is therefore able to be manufactured at low cost.

It is an additional object to provide a bit for forming a suitably shaped cavity in the base of the workpiece to be turned.

According to one aspect of the present invention there is disclosed an expandable woodturning chuck adapted to be secured to a substantially conventional faceplate; said chuck comprising a generally annular member having a substantially conical internal bore and being radially segmented into a plurality of portions which are urged together by annular resilient biasing means; a frusto-conical plug having a maximum diameter greater than the minimum diameter of said bore; and fastener means extending through said bore between said faceplate and plug to draw said plug into said bore towards said faceplate and thereby clamp said annular member against said faceplate, whereby movement of said plug radially expands said annular member to grip the interior surface of a cavity formed in a workpiece to be turned.

According to another aspect of the present invention there is disclosed a bit for forming a cylindrical cavity in a workpiece to be turned, said bit comprising a shank; a cross-member centrally located on, and extending transversely across, said shank; and a cutting ridge located in the centre of said cross-member, extending transversely across the surface of said cross-member remote from said shank wherein said surface on each side of said ridge is inclined to a plane perpendicular to the longitudinal axis of said shank to form a cutting edge, said two inclined surfaces being inclined in opposite directions.

Embodiments of the present invention will now be described with reference to the drawings in which.

Figure 1:
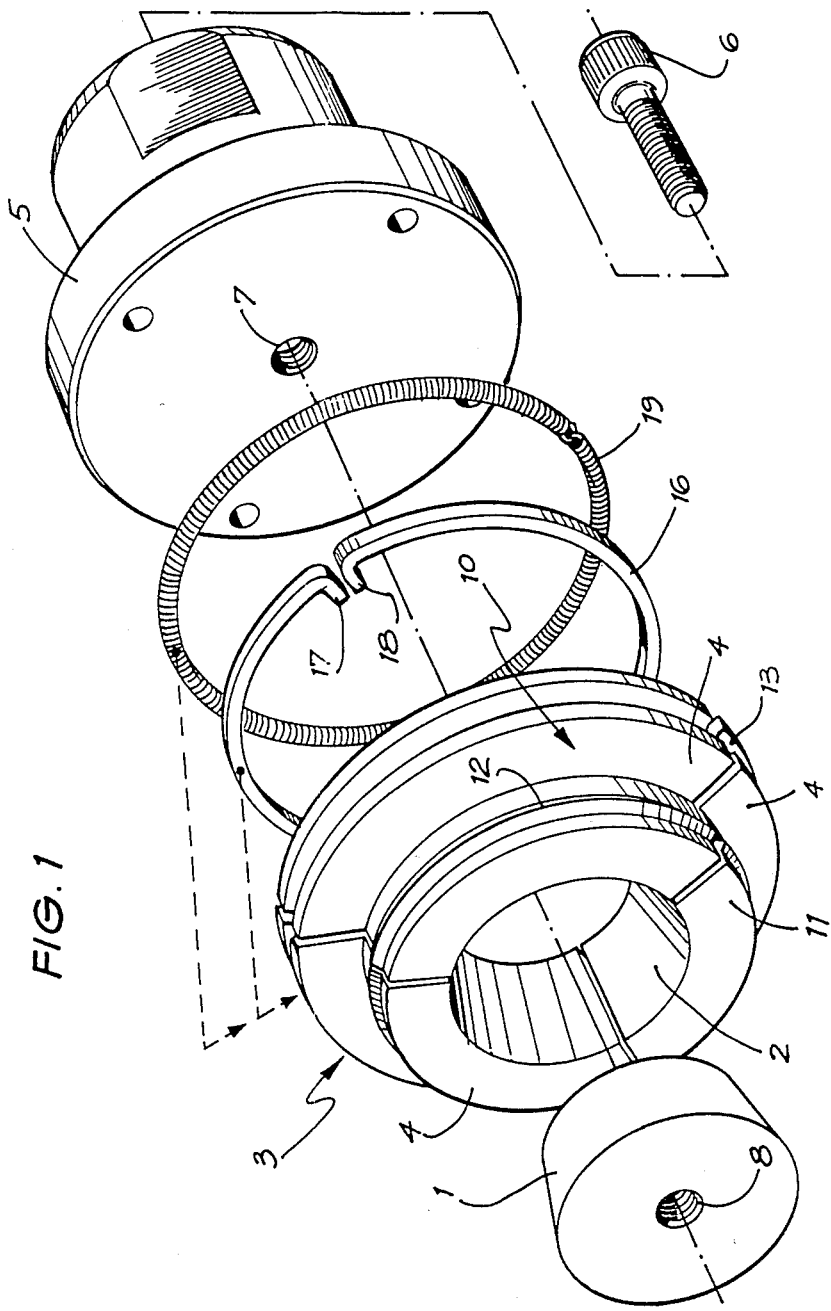
FIG. 1 is an exploded perspective view of the chuck of a first embodiment.
Figure 2:
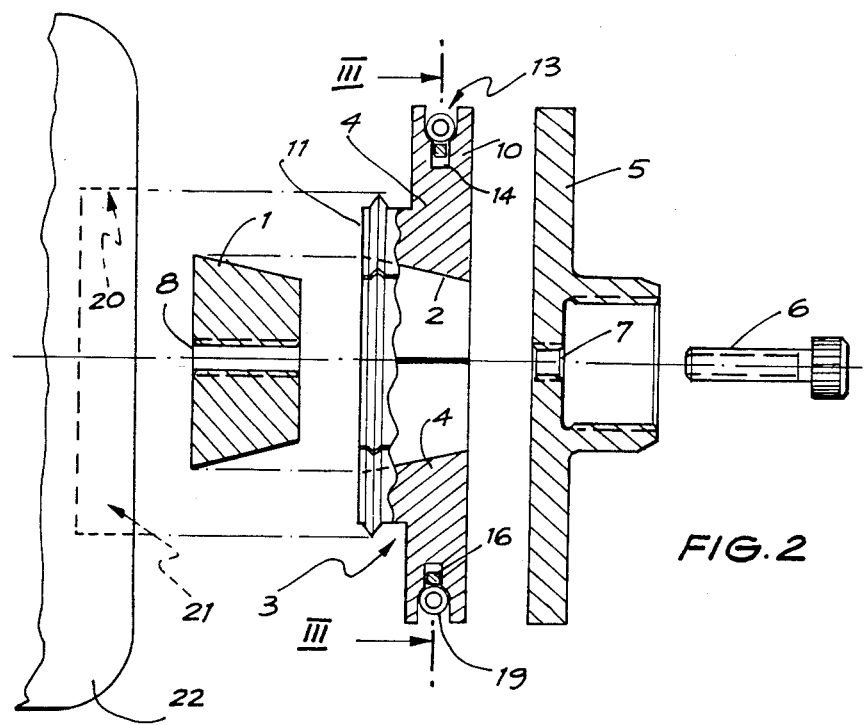
FIG. 2 is an exploded longitudinal cross-sectional view through the chuck of FIG. 1.
Figure 3:
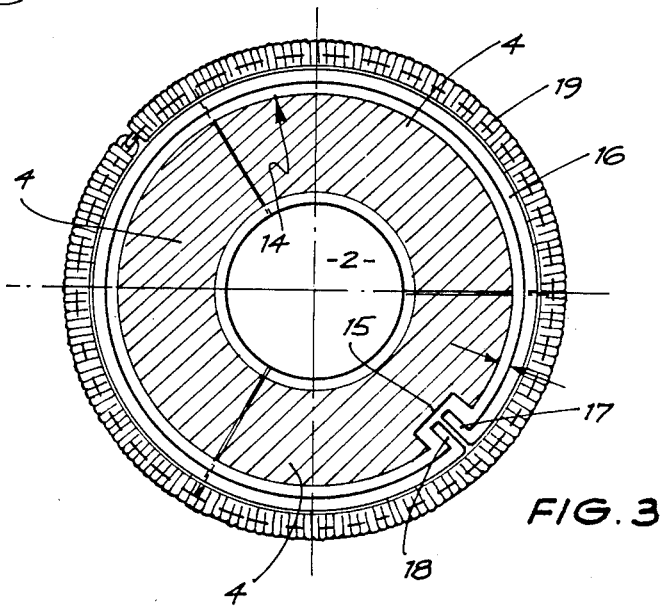
FIG. 3 is a transverse cross-sectional view along the line III—III of FIG. 2.

Turning now to FIGS. 1 to 3, it will be seen that the chuck of the first embodiment is formed from a frusto-conical plug 1 which is received in the conical bore 2 of an annular member 3. The annular member 3 is formed into three portions 4 in order to permit radial expansion of the annular member 3.

The annular member 3 is clamped to the face of a substantially conventional faceplate 5 by means of a bolt 6 which passes through a threaded, centrally located opening 7 in the faceplate 5, the shank of the bolt 6 passing through the bore 2 and into a threaded, centrally located, aperture 8 in the plug 1.

Since the maximum diameter of the plug 1 is greater than the minimum diameter of the bore 2, by rotating the annular member 3 and plug 1 about the shank of the bolt 6, the annular member 3 can be expanded as the plug 1 is drawn towards the faceplate 5.

The annular member 3 is formed from an annular disc 10 which carries a substantially annular boss 11 on that side of the disc 10 facing away from the faceplate 5. The boss 11 includes a centrally located annular ridge 12.

As best seen in FIG. 2, the periphery of the disc 10 is provided with an annular groove 13 having an annular slot 14 formed in the base thereof. As seen in FIG. 3, a keyway 15 is also formed in one portion of the slot 14.

A keeper 16 somewhat similar to a piston ring but having either a square cross-section as illustrated or a circular cross-section is located in the slot 14. The ends 17,18 of the keeper 16 are bent radially inwardly and are located within the keyway 15 as best seen in FIG. 3.

An annular spring 19 formed by joining a helical spring end to end is located in the groove 13 and provides a resilient restoring force which tends to push the portions 4 of the annular member 3 radially inwardly against the action of the plug 1. However, the spring 19 is sufficiently extendable to allow the boss 11 to expand to the degree necessary for the ridge 12 to securely grip the internal cylindrical wall 20 of a cavity 21 formed in the base of a workpiece 22 (FIG. 2). In this way the workpiece 22 can be removed from the chuck after some woodturning, and be re-centred automatically as the boss 11 expands within the cavity 21.

However, since the chuck may be mounted on a lathe capable of high speed revolutions, the keeper 16 provides a measure of safety which prevents the chuck flying apart. It will be appreciated that at high speed the portions 4 are moved radially outwardly under centrifugal force until the innermost surface of the slot 14 comes into contact with the keeper 16 and the ends 17,18 of the keeper 16 abut opposite ends of the keyway 15. When this configuration is reached, further expansion of the annular member 3 is prevented.

Figure 4:
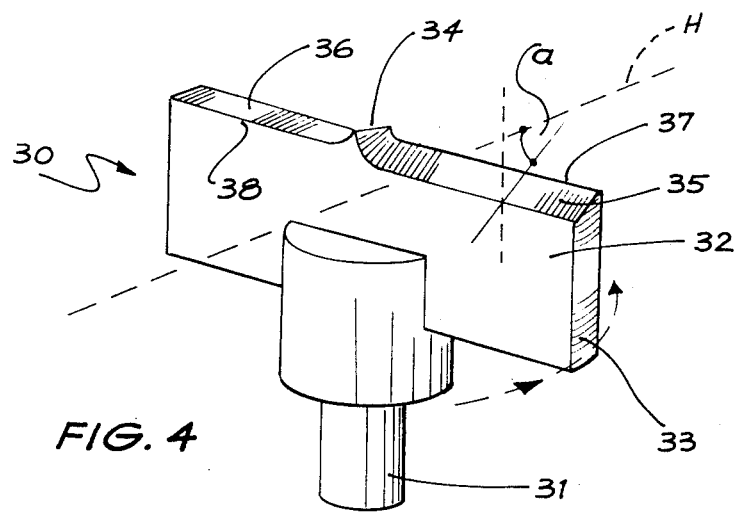
FIG. 4 is a perspective view of a bit used to form a cylindrical cavity in the base of the workpiece to be turned on the chuck of FIGS. 1 to 3.

Turning now to FIG. 4, a bit 30 for forming the cylindrical cavity 21 of FIG. 2, is illustrated. The bit 30 has a shank 31 and a generally rectangular cross-member 32 centrally and transversely mounted on the shank 31. The extremities of the cross-member 32 are provided with a radially curved surface 33 which has a radius of curvature half the diameter of the intended cavity 21 (FIG. 2).

In addition, a cutting ridge 34 is centrally located on the leading surfaces 35,36 of the bit 30. The leading surfaces 35, 36 are inclined in opposite directions to, but by an equal angle a from, a plane perpendicular to the longitudinal axis of the shank 31, the plane being generally indicated by the dashed line H in FIG. 4.

It will be apparent that rotation of the bit 30 in the direction indicated by the arrows in FIG. 4 results in cutting edges 37,38 and the cutting ridge 34 forming the cavity 21 in the workpiece 22 of FIG. 2.

Figure 5:
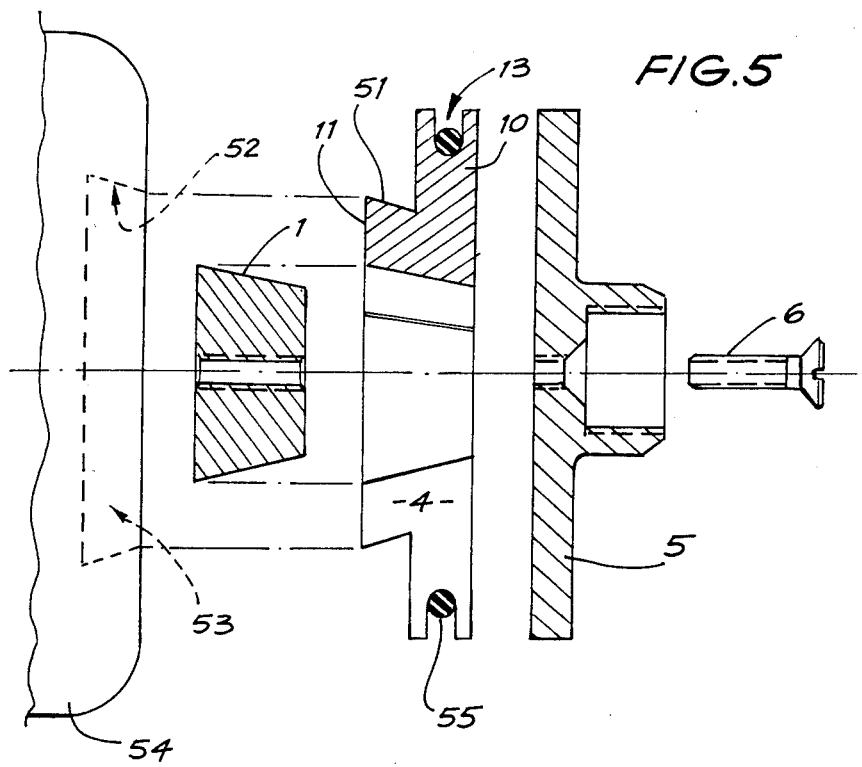
FIG. 5 is a view similar to FIG. 2 but of a chuck of a second embodiment.

Turning now to FIG. 5, it will be seen that a chuck of the second embodiment is substantially similar to that of the chuck of FIGS. 1 to 3, save that the boss 11 is provided with a frusto-conical surface 51 which mates with a frusto-conical interior surface 52 of a cavity 53 in a workpiece 54.

In addition, although the groove 13 is as before, no slot 14 is provided and the portions 4 of the annular member 3 are urged radially inwardly by an O-ring 55. Thus the chuck of the second embodiment is only suitable for use with lathes able to be rotated at relatively low maximum speeds.

It will be apparent that the "dove tailed" cavity 53 of the workpiece 54 of FIG. 5 is a relatively difficult cavity to form since first a cylindrical cavity must be formed and then the frusto-conical interior surface 52 must be turned. This is a relatively complex task and therefore the embodiment of FIG. 1 with the annular boss 11 and ridge 12 provides a better arrangement.

The foregoing describes only some embodiments of the present invention and modifications, obvious to those skilled in the art, can be made thereto without departing from the scope of the present invention.

What I claim is:

1. In combination, an expandable woodturning chuck and a substantially conventional face plate, said chuck comprising a generally annular member having two opposite end faces, and a substantially conical internal bore extending between said end faces, and said annular member being radially segmented into a plurality of portions the radially outer surfaces of which are shaped to grip the interior surface cavity of a workpiece; an annular resilient biasing means located exterior of, and substantially co-axial with, said annular member to urge said portions radially inwardly; a single frusto-conical plug located within, and co-axial with, said bore, said plug being rotatable relative to said bore, having a maximum diameter greater than the minimum diameter of said bore, and having a centrally located threaded aperture; and said face plate having a threaded shank secured thereto and extending away from said face plate, wherein one end of said chuck abuts said face plate, said chuck is rotatable relative to said face plate about said threaded shank, said threaded shank extends through said bore towards said plug and threadedly rotatably engages said centrally located threaded aperture in said plug, whereby relative rotation between said shank and said annular member draws said plug into said bore towards said face plate and thereby clamps said annular member against said face plate, the movement of said plug into said bore radially expanding said annular member to grip the interior surface of a cavity formed in a workpiece to be turned.

2. The combination as claimed in claim 1 wherein said shank comprises the shank of a fastener extending through the face plate.

3. The combination as claimed in claim 2 wherein said fastener comprises a bolt passing through, and being threadably engaged with, a threaded, centrally located opening in said face plate.

4. The combination as claimed in claim 1, 2 or 3 wherein said annular member comprises an annular disc having a centrally located substantially annular boss thereon extending from said disc away from said faceplate, the diameter of said disc being larger than the diameter of said boss and the periphery of said disc having an annular groove within which said biasing means is located.

5. The combination as claimed in claim 1 wherein said boss has a frusto-conical outer surface, the diameter of said boss adjacent said disc being less than the diameter of said boss adjacent its extremity.

6. The combination as claimed in claim 5 wherein said boss has a cylindrical outer surface with an annular ridge protruding outwardly therefrom.

7. The combination as claimed in claim 4 wherein said groove has an annular slot in the base of said groove extending circumferentially around said disc, and a substantially inextensible annular keeper located in said slot, the internal diameter of said keeper being greater than the diameter of said slot whereby expansion of said annular member against the action of said resilient biasing means beyond a predetermined extent is prevented by engagement of said keeper and slot.

8. The combination as claimed in claim 4 wherein said boss has a frusto-conical outer surface, the diameter of said boss adjacent said disc being less than the diameter of said boss adjacent its extremity.

9. The combination as claimed in claim 4 wherein said boss has a cylindrical outer surface with an annular ridge protruding outwardly therefrom.

* * * * *